Figure 1:
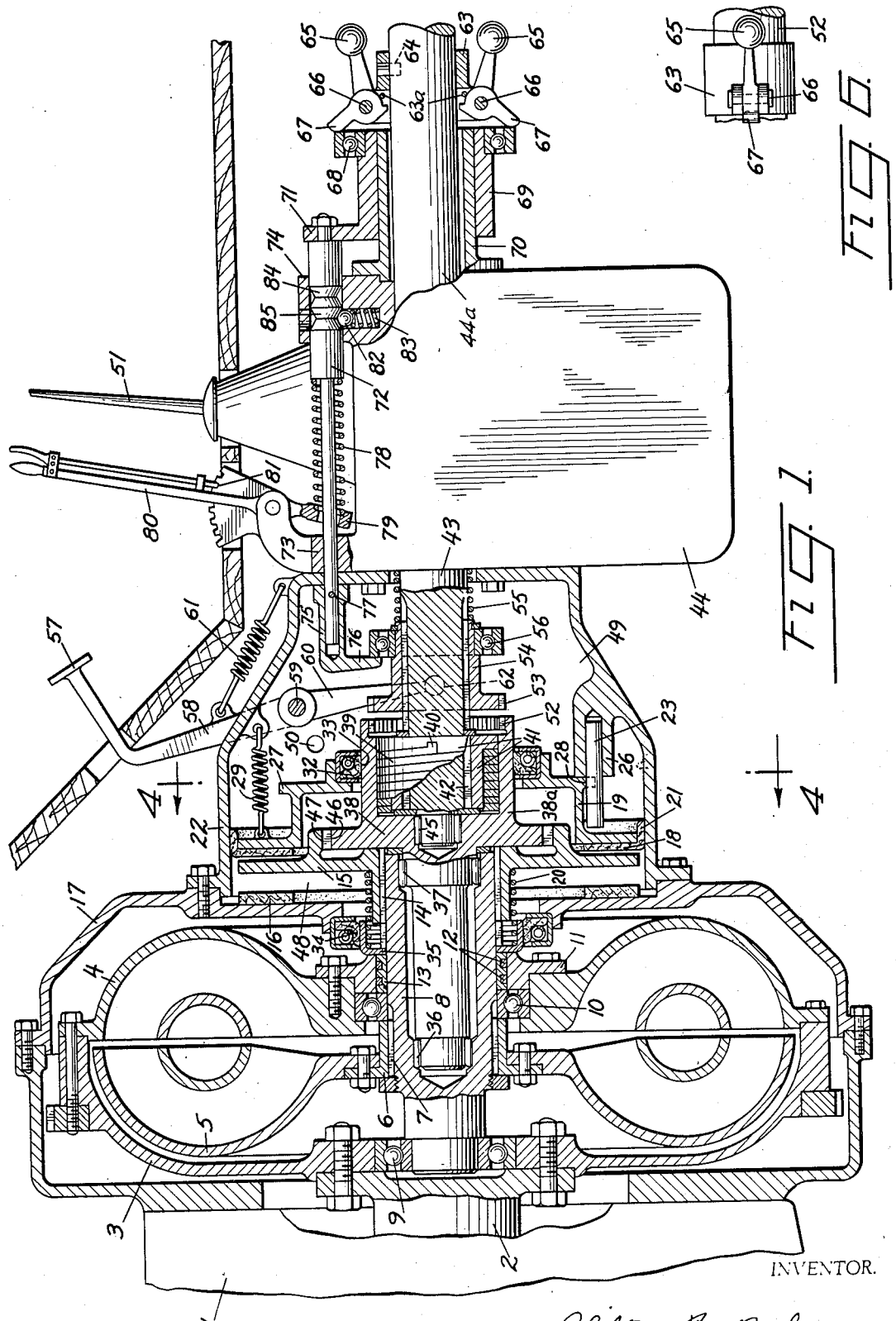

Feb. 5, 1946.   C. R. ROCHE   2,394,331
TRANSMISSION CONTROL MECHANISM
Filed Aug. 21, 1941   2 Sheets-Sheet 2
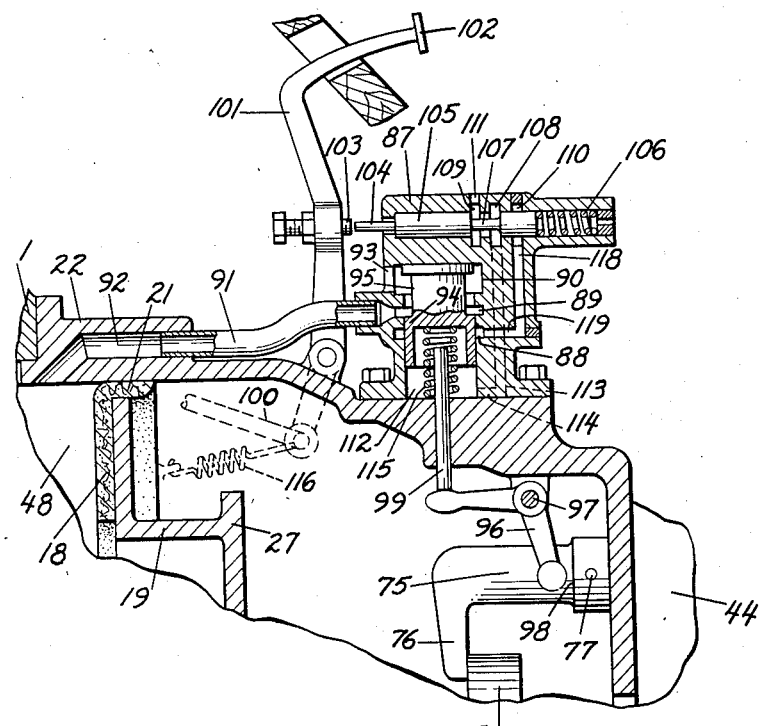
Fig. 2.
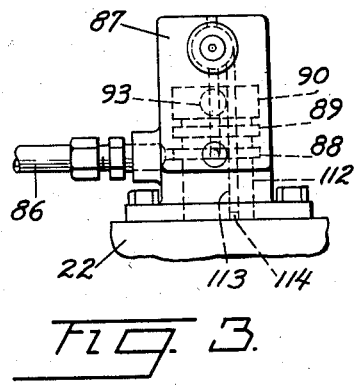
Fig. 3.
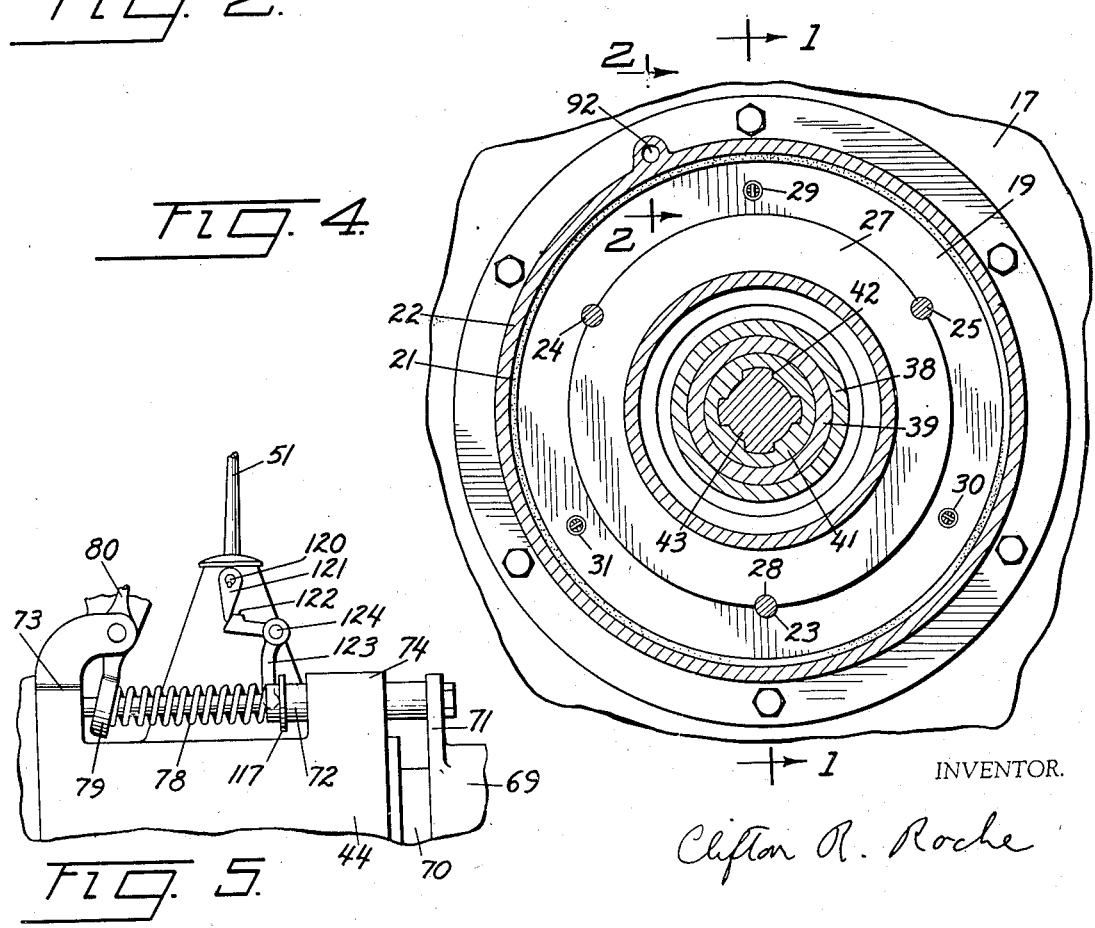
Fig. 4.
Fig. 5.
INVENTOR.
Clifton R. Roche

UNITED STATES PATENT OFFICE 2,394,331

TRANSMISSION CONTROL MECHANISM

Clifton R. Roche, Los Angeles, Calif.

Application August 21, 1941, Serial No. 407,830

13 Claims. (Cl. 74—189.5)

My invention relates to transmission controls and particularly to transmissions having as a coupling with the engine, a fluid flywheel.

The use of the fluid flywheel has been limited due to the fact that no matter how slow the engine is running there is never a complete freedom of drag on the driven member of the fluid flywheel, therefore making it impossible to shift from neutral to low or reverse when the vehicle is standing still, or to shift from one speed to another when the vehicle is in motion.

One of the objects of my invention is to provide a control for the fluid flywheel and transmission which will allow shifting of the transmission whenever desired.

A further object of my invention is to provide a device that will eliminate much of the labor of shifting, by eliminating the conventional clutch pedal.

A further object of my invention is to provide an improved controlled free-wheeling which is cut out at high speeds, when free-wheeling is dangerous, and will cut in at low speeds when traffic conditions are encountered.

A further object of my invention is to provide the operator with an adjustable control with which he may adjust the speed at which the free-wheeling will be cut in and out.

Further objects and advantages of my invention will be made evident throughout the following part of the specification.

Referring to the drawings which are for illustrative purposes only;

Fig. 1 is a vertically longitudinally section view through a preferred embodiment of my invention, Fig. 2 is a fragmentary cross section through the control valves. The horizontal location of the valves in respect to the section view shown in Fig. 1, is represented by the line 2—2 of Fig. 4, Fig. 3 is a rear view of the valve housing shown in Fig. 2, Fig. 4 is a fragmentary cross section on a plane represented by the line 4—4 of Fig.1, Fig. 5 shows an optional method of throwing the device into free-wheeling when the shifting lever is moved, and when this method is used the small clutch button 57 may be eliminated, and Fig. 6 is a top view of the governor.

Referring to the drawings, an engine 1 has a crank shaft 2, on the flange of which is bolted a driving member 3, to which is bolted a driving member, or impeller 4 of a fluid flywheel. A driven member, or impeller 5, of the fluid flywheel is bolted to a hub 6 which is secured to a drive shaft 8 by the splines 7. The drive shaft 8 is supported in bearings 9 and 10. The bearing 10 is held in place by a flange 11 which has a hole in its center upon which rings 12 rest. These rings are held in place by a ring retainer 13 which is pressed on the drive shaft 8, and are for the purpose of preventing leakage of the operating fluid of the fluid flywheel. On the other end of the drive shaft 8 are splines 14 which will allow a brake plate 15 to slide in a forward and rear position. A spring 20 tends to keep the brake plate in the rear position.

A disc of friction material 16 is riveted to a stationary housing 17, and another disc of friction material 18 is fastened to a pressure plate 19. The edge of this disc 18 is flanged over as shown at 21 thereby forming the pressure plate into a piston which may reciprocate within a cylindrical surface formed in a housing 22. To prevent this piston (or the pressure plate 19) from rotating are studs 23, 24 and 25 (see Fig. 4) pressed into bosses 26 which are part of the housing 22. The pressure plate 19 is provided with a flange 27 and in this flange are cut notches 28 so that they will mesh with the studs. The pressure plate can slide to the front and rear along the studs and is held in the rear position by springs 29, 30 and 31. The pressure plate 19 is provided with a seal 32 to prevent air from passing by the surface 33. A similar seal 34 is provided for the housing 17. This seal 34 prevents the passage of air along the surface of a cup-shaped member 35, which member also serves as a retainer for the spring 20.

In the hollow drive shaft 8 are two sets of rollers 36 and 37 which form bearings to support a driving element of a free-wheeling unit 38a. Any type of free-wheeling unit may be used and the one shown is of well known design and consists of a driving element 38 which has a cylindrical surface into which a coil spring 39 is wound. The front end of this coil spring is free but the rear end 40 is fastened to a driven element of the free-wheeling unit 41. This driven element is locked by splines 42 to a transmission drive shaft 43 of a transmission unit 44. The transmission drive shaft 43 is guided by a pilot bearing 45. Now, viewing from the front, if the element 38 is rotated in a clockwise direction, the spring 39 will tend to unwind thereby gripping tightly to the cylindrical surface of 38, and being fastened to the driven element 41 which in turn is fastened to the transmission drive shaft 43, the transmission drive shaft will therefore be forced to rotate at the same speed as the driving element. On the other hand, if the transmission drive shaft is operating at a certain speed, the speed of the driving element 38 can always be reduced from said certain speed as that would cause a relatively counterclockwise motion that the driving element 38 would have in respect to driven element 41, which would tend to tighter wind the spring 39 causing it to diminish in diameter, thereby causing said spring to lose its grip on the cylindrical surface and thereby prevent the driving shaft 43 from driving the driving element 30, thus allowing its speed to be reduced.

Radially mounted on the driving element 38 are teeth 46 which mesh with internal teeth 47 which are a part of brake plate 15, thereby forming a coupling which is locked if the brake plate is in the rear position as shown, or is unlocked if the brake plate is moved to a forward position which cause the teeth to come out of mesh.

It can be seen from the drawings that the housing 22 is separated by the piston 19 into two compartments, 48 and 49. The compartment 48 is completely sealed, forming an airtight compartment, by the seals 34, 32, and 22; but the compartment 49 is provided with a vent hole 50 to always provide it with atmospheric pressure.

Means are provided so that under certain conditions the compartment 48 is connected to the intake manifold of the engine thereby causing a partial vacuum therein, and with atmospheric pressure in compartment 49 the pressure plate will be forced forward. As it moves forward, the friction surface 18 comes in contact with the brake plate 15 thereby forcing it also forward until it comes in contact with the friction surface 16; the movement forward of the brake plate 15 also unlocks the coupling as previously explained. As the brake plate 15 is connected to the driven impeller 5 of the fluid flywheel, two results are accomplished; first, the transmission is completely disconnected from the fluid flywheel, and second, the driven impeller is brought to a stop by the brake that is formed by the brake plate between the friction surfaces 16 and 18.

The transmission unit 44 may be of any suitable design. The one shown has the usual gear shift lever 51, and a transmission driven shaft 52 which is suitably connected to the driving axle of the vehicle.

The free-wheeling unit is provided with a lockout clutch, or means for bridging the drive past the free-wheeling unit, and consists of the internal teeth 52 which are cut into the free-wheeling driving element 38, and external teeth 53 which can slide in and out of mesh and are cut on a flange of a sleeve 54 which will slide forward and backward on continuations of the splines 42 of the transmission drive shaft 43. A relatively light spring 55 tends to hold the lockout clutch in the locked position (not as shown). A bearing 56 has its inner race fastened to the sleeve 54 so that a thrust to the rear on the outer race of the bearing will cause the lockout clutch to become disengaged, and the free-wheeling unit can free wheel; but if said thrust is released the spring 55 will cause the lockout clutch to become engaged and the free wheeling unit cannot free wheel.

A number of ways may be provided to control the lockout clutch. One is by a small button 57 placed convenient to the operator's foot and could take the place of the conventional clutch pedal. The button is mounted on an arm 58, which is fastened to a shaft 59. A yoke 60 is also fastened to the shaft 59. This yoke has two fingers 62 that will thrust against the outer race of the bearing 56, thereby allowing the free-wheeling unit to free-wheel when the driver presses on the button 57. A spring 61 will hold the button in the up position when the operator removes his foot. A second method to control the lockout clutch is automatic, and consists of a governor mounted on the transmission driven shaft so that the lockout of the free-wheeling unit will occur according to the speed of the car. This governor consists of a bracket 63 which is pinned to the driven shaft 44a by a pin 64. Governor weights 65 are mounted on bell crank levers 67 which are pivotally mounted in the bracket 63 by pins 66. The bell crank is so arranged that as the centrifugal force throws the weights outward, the bell crank arm will thrust against the outer race of a bearing 68. This bearing has its inner race fastened on a sliding member 69 which slides on an extension 70 of the transmission case. Stop pins 63a are provided to limit the travel of the weights so as to prevent them from causing unnecessary force on the bearing 68 at very high speeds.

The sliding member 69 has a projection 71 to which is bolted a control rod 72. This control rod is guided by bosses 73 and 74. A member 75 is fastened to the forward end of the control by a pin 77 and has a finger 76 so arranged that a thrust to the rear will cause the finger 76 to thrust against the outer race of the bearing 56 that controls the free-wheeling lockout clutch. A spring 78 tends to force the control rod to the rear, thereby opposing the centrifugal force caused by the weights of the governor. The tension of this spring is adjustable by the operator having one end resting against a spring guide 79 which is the extension of an adjustment lever 80 conveniently located in the operator's compartment so that the operator can adjust spring tension and lock it in the desired position by a locking device 81. The spring 78 is relatively heavy compared to the spring 55 so that as the car approaches slow speed the spring 78 will eventually overcome the resistance of the centrifugal force of the governor, and the opposing force of the spring 55 and will move the control bar 72 to the rear so that the free wheel lockout clutch will become disengaged and the free wheel unit can free wheel. As the car is speeded up, the reverse action takes place and the free-wheeling unit is locked out and prevented from free wheeling. A ball 82 is forced by a spring 83 against the control bar 72, and notches 84 and 85 are cut in the control bar to register with the ball so as to provide a snap action to the control.

It is of course possible to shift gears from first to second and second to third (or down) when the free-wheeling unit is allowed to free wheel and the operator lifts up on his accelerator, thereby allowing the transmission drive shaft to "overrun" in relation to the shaft 8, which is substantially the same as declutching the motor from the transmission. Therefore, it is only necessary to operate the coupling clutch (46—47) in order to be able to shift from neutral to low or reverse, or to bring the vehicle to a complete standstill. Therefore, I provide means for automatically controlling the conditions to operate the coupling clutch.

Referring to Fig. 2, a pipe 86 is connected to the intake manifold of the engine. This allows the manifold vacuum to communicate with an annular groove 88 cut into a valve body 87. A second annular groove 89 communicates by means of a pipe 91 and passage 92, to the compartment 48. A third annular groove 90 is open to atmosphere by means of the hole 93. A valve plunger 94 operates within the valve body and has an annular groove 95. When the valve plunger is up (as shown), the annular groove 89 will communicate with the annular groove 90 by means of the annular groove 95, and there is no communication between 89 and 88, so that the compartment 48 will be open to atmospheric pressure. If the valve plunger is moved down, communication between 89 and 90 is cut off and there will be communication between 89 and 88 by means of the annular groove 95, so that the compartment 48 will be open to the intake manifold vacuum.

A bell crank lever 96 is pivotally mounted to the case 22 by a pin 97. One arm of this lever is arranged to hit against a collar 98 of the member 75 and the other arm hits against a push rod 99. If the control bar 72 is in the back position (as shown) the valve plunger is free to operate up and down, but if the control bar 72 is moved to the forward position, which corresponds to higher car speeds, the collar 98 will force the bell crank lever to push the push rod 99 up and prevent the valve plunger from moving out of its up position. Therefore, for higher car speeds the compartment 48 will always be open to atmosphere and the coupling clutch will not be allowed to disengage. When the vehicle is in the lower speed range, which allows the valve plunger to operate, means are provided so that the coupling clutch will become disengaged only when the accelerator has substantially closed the engine throttle. This is accomplished as follows: A control rod 100 is connected to control the engine throttle, and controlled by an accelerator lever 101, which has an accelerator pedal 102. In the position shown, the accelerator pedal has been slightly depressed and an adjusting screw 103 has just moved away from an extension 104 that is part of a small valve plunger 105. This allows the small valve plunger 105 to be held in its forward position by a spring 106. The small valve plunger is provided with an annular groove 107 and this annular groove now registers to allow communication between annular grooves 108 and 109. A hole 111 in the valve body admits atmospheric pressure, which is admitted to a compartment 112 under the (large) valve plunger 94 by means of passages 113 and 114. As the hole 93 admits atmospheric pressure on top of the (large) valve plunger 94, the pressures are balanced, and a spring 115 will hold the (large) valve plunger 94 in the up position, as shown.

Now if the pressure is released from the accelerator pedal, a relatively heavy spring 116 will force the adjusting screw 103 against the extension 104 and force the small valve plunger 105 to the right so as to register the annular groove 107 with annular grooves 108 and 110. As previously explained, the annular groove 88 communicates with the partial vaccum in the intake manifold, and therefore by means of passages 118 and 119, the communication of the annular grooves 110 and 108, and passages 113 and 114, said partial vacuum is directed to the compartment 112 which sucks the (large) valve plunger 94 to its down position, which as previously explained causes the coupling clutch to become disengaged, and the brake (15, 16 and 18) to engage.

Many transmissions are manufactured embodying a free-wheeling unit, in which case this free-wheeling unit could be used. It is not necessary that the free-wheeling unit be placed in front of the transmission.

The operation is as follows: After the engine is started, the driver lifts his foot from the accelerator pedal, which as just explained causes the coupling clutch to become disengaged, and the brake on the driven impeller to stop the rotation of the driven impeller. The operator now can shift into low. He now presses down on the accelerator to start the vehicle. This immediately releases the brake on the driven impeller and engages the coupling clutch, and the vehicle starts forward. It will be noted that when the car is standing still both of the elements of the coupling clutch are not rotating, therefore upon depressing the accelerator the teeth 46 and 47 will immediately mesh without clashing, as the inertia of the impeller 5 will prevent it, with its attached parts, from obtaining any appreciable rotating movement before the teeth have become meshed. Let us assume that the adjusting lever 80 has been set for a free-wheeling lockout at 25 miles per hour. The driver then continues to accelerate in low to the desired speed and then backs off on the accelerator and shifts into second. He then accelerates in second and again backs off on the accelerator and shifts into high. When the speed increases beyond twenty-five miles per hour, the free wheeling will be automatically locked out. This is a very desirable condition for it is usually conceded that at high road speeds free wheeling is undesirable, whereas when traffic conditions are encountered and the speed is slow, free-wheeling is desirable to allow ease of shifting.

In case the operator wishes to shift at a higher speed than twenty-five miles per hour, he may do so by pressing down on the button 57 while making the shift. In case a driver does not like to free-wheel even in traffic, he may adjust the lever 80 accordingly. Then it will, of course, be necessary to press the button 57 while making the shift, similar to the use of the conventional clutch pedal, or he may just hold the button down continuously as he shifts from low, to second, to high, and then after he is in high he may release the button.

To bring the vehicle to a complete stop it is only necessary to remove the foot from the accelerator and apply the vehicle brakes, for when a low speed is reached, the governor will allow the large valve 94 to operate and admit the vacuum to the compartment 48 which will release the clutch formed by the teeth 46 and 47, thus disconnecting the engine.

An optional method for automatically controlling bridging the drive past the free-wheeling unit or, through the free-wheeling unit whenever a shift is to be made, is shown in Fig. 5. When this method is used it is not necessary to use the clutch button 57.

A shaft 120 is rocked by movement of the shifting lever 51. (The shifting lever is shown in its rear position.) To this shaft is fastened a cam 121. The cam has a cam follower 122 which is part of bell crank 123 which pivots on a stud 124 extending from transmission housing. One arm of the bell crank acts upon a flange 117 which is part of the control rod 72. The cam is so formed that a movement of the shifting lever 51 from either gear position to the other gear position will force the cam follower down and cause the bell crank to move the control rod 72 to the right, in case the governor has not already done this. As the control rod 72 controls the free-wheeling, this arrangement insures that the drive is through free-wheeling and not locked out of free-wheeling, whenever a shift is made, and all that is necessary for the driver to do, is to back up slightly on the accelerator pedal to allow free-wheeling as the shift is made.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

What I claim is:

1. In a transmission control mechanism, the combination of a fluid flywheel having a driven member, a transmission having a shifting mechanism and a driven member, a brake for the driven member of the fluid flywheel, and automatic means for applying the said brake to prevent rotation of the driven member of the fluid flywheel to allow a smooth shift in connecting members associated with the fluid flywheel and members of the transmission that are not at the time rotating, said automatic means allowing the application of said brake only when the driven member of the transmission is stopped, or rotating at a slow rate of speed.

2. In a transmission control mechanism, the combination of a fluid flywheel having a driven member, a transmission having a shifting mechanism and a driven member, a brake for the driven member of the fluid flywheel to prevent rotation of the said driven member of the fluid flywheel, and means for preventing application of the said brake except when the driven member of the transmission is moving at a slow rate of speed.

3. In a transmission control mechanism for use with an engine having a throttle, the combination of a fluid flywheel having a driven member, a transmission having a shifting mechanism and a driven member, a brake for the driven member of the fluid flywheel to prevent rotation of the said driven member of the fluid flywheel, and means for applying the said brake only when the engine throttle is in a retarded position, and when the driven member of the transmission is moving at a slow rate of speed.

4. In a transmission control mechanism for use with an engine having a throttle, the combination of a fluid flywheel having a driven member, a transmission having a shifting mechanism and a driven member, a brake for the driven member of the fluid flywheel to prevent rotation of the said driven member of the fluid flywheel, and vacuum means for applying the said brake only when the engine throttle is in a retarded position, and when the driven member of the transmission is moving at a slow rate of speed.

5. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging a driving connection between the driven member of the transmission and the driven member of the fluid flywheel, means for disengaging the said clutch and applying the said brake when the engine throttle control is in a retarded position, and means for preventing disengagement of the said clutch except when the application of the said brake except when the driven member of the transmission is moving at a slow rate of speed.

6. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging a driving connection between the driven member of the transmission and the driven member of the fluid flywheel, vacuum means for disengaging the said clutch and applying the said brake when the engine throttle control is in a retarded position, and means for preventing disengagement of the said clutch and application of the said brake except when the driven member of the transmission is moving at a slow rate of speed.

7. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging the transmission and the fluid flywheel, means controlled by the engine throttle control for disengaging the said clutch and applying the said brake when the engine throttle control is in a retarded position, and for releasing the said brake and engaging the said clutch when the engine throttle control is moved from the retarded position, and means for inhibiting the action of the last named means excepting when the said driven member of the transmission is moving at a slow rate of speed.

8. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging the transmission and the fluid flywheel, means controlled by the engine throttle control for disengaging the said clutch and applying the said brake when the engine throttle control is in a retarded position, and for releasing the said brake and engaging the said clutch when the engine throttle control is moved from the retarded position, means for inhibiting the action of the last named means excepting when the said driven member of the transmission is moving at a slow rate of speed, for allowing shifting of the shifting mechanism of the transmission when the said driven member of the transmission is moving at the said slow rate of speed or is stopped, and an over-running clutch for allowing shifting of the shifting mechanism of the transmission when the said driven member of the transmission is moving at speeds greater than the said slow rate of speed.

9. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging the transmission and the fluid flywheel, vacuum means controlled by the engine throttle control for disengaging the said clutch and applying the said brake when the engine throttle control is in a retarded position, and for releasing the said brake and engaging the said clutch when the engine throttle control is moved from the retarded position, means for inhibiting the action of the last named means excepting when the said driven member of the transmission is moving at a slow rate of speed, for allowing shifting of the shifting mechanism of the transmission when the said driven member of the transmission is moving at the said slow rate of speed or is stopped, and an over-running clutch for allowing shifting of the shifting mechanism of the transmission when the said driven member of the transmission is moving at speeds greater than the said slow rate of speed.

10. In a transmission control mechanism for use with an engine having a throttle control, the combination of a fluid flywheel having a driven member, a transmission having a shifting mechanism and a driven member, a brake for the driven member of the fluid flywheel, a clutch for engaging or disengaging the transmission and the fluid flywheel, means controlled by the engine throttle control for disengaging the said clutch and applying the said brake when the engine throttle control is in a retarded position, and for releasing the said brake and engaging the said clutch when the engine throttle control is moved from the retarded position, means for inhibiting the action of the last named means excepting when the said driven member of the transmission is moving at a slow rate of speed, for allowing shifting of the shifting mechanism of the transmission when the said driven member of the transmission is moving at the said slow rate of speed or is stopped, an over-running clutch for allowing shifting of the shifting mechanism of the transmission when the said driven member of the transmision is moving at speeds greater than the said slow rate of speed, means for bridging the drive past the over-running clutch, and means controllable at will for causing the drive through the over-running clutch.

11. In a transmission control mechanism for use with an engine having a throttle control, the combination of a fluid flywheel having a driven member, a transmission having a shifting mechanism, a brake for the driven member of the fluid flywheel, a clutch for engaging or disengaging the transmission and the fluid flywheel, actuating means for disengaging the said clutch and applying the said brake when the engine throttle control is in a retarded position, and for releasing the said brake and engaging the said clutch when the engine throttle control is moved from the retarded position, means for inhibiting the action of the actuating means, a governor driven by a governor driving member of the transmission for controlling the last named means in such a way as to inhibit the action of the actuating means excepting when the said governor driving member of the transmission is moving at a slow rate of speed, for allowing shifting of the shifting mechanism of the transmission when the said governor driving member of the transmission is moving at the said slow rate of speed or is stopped, an over-running clutch in driving relation with the transmission, means for bridging the drive past the over-running clutch, means actuated by the said governor means for causing the drive to drive through the over-running clutch when the said governor driving member is rotating below a given speed and for causing the drive to drive through the means for bridging the drive past the over-running clutch when the said governor driving member is rotating faster than the said given speed, and means controllable at will for causing the drive to go through the over-running clutch.

12. In a transmission control mechanism, the combination of a transmission having a shifting mechanism, an over-running clutch, governor means driven by a member of the transmission, engageable driving means for bridging the drive past the over-running clutch, means associated with the governor means for causing engagement of the said engageable driving means at a predetermined speed of the said member of the transmission, means controllable by the operator for controlling the shifting mechanism of the transmission for shifting from one ratio to another, and means actuated by the last named means for insuring that the drive is through the over-running clutch when the said shifting mechanism of the transmission is shifting from one ratio to another.

13. In a transmission control mechanism, the combination of a transmission, a fluid flywheel having a driven member, a brake for the said driven member to prevent rotation thereof, a governor connected to a member of the transmission so as to be controlled by the speed of such member, and means controlled by the said governor for preventing the application of the said brake except when the said member of the transmission is moving at a slow rate of speed.

CLIFTON R. ROCHE.